United States Patent
Huang et al.

(10) Patent No.: US 7,043,590 B2
(45) Date of Patent: May 9, 2006

(54) INTERFACE APPARATUS USING SINGLE DRIVER, COMPUTER SYSTEM INCLUDING INTERFACE APPARATUS USING SINGLE DRIVER, AND RELATED METHOD

(75) Inventors: Shien-Ming Huang, Taipei (TW); Shang-Yii Huang, Tai-Chung Hsien (TW); Hsin-I Chou, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 75 days.

(21) Appl. No.: 10/709,788

(22) Filed: May 28, 2004

(65) Prior Publication Data

US 2005/0268018 A1    Dec. 1, 2005

(51) Int. Cl.
*G06F 13/14*     (2006.01)
*G06F 13/42*     (2006.01)

(52) U.S. Cl. .................................. 710/305; 710/313
(58) Field of Classification Search ................ 710/305, 710/104, 313–315, 10, 110; 711/100, 147, 711/154; 361/683, 687; 709/208; 719/321, 719/327; 712/32, 36; 370/257, 453; 713/1
See application file for complete search history.

(56) References Cited

U.S. PATENT DOCUMENTS

| | | | | |
|---|---|---|---|---|
| 3,795,800 A | * | 3/1974 | Nimmo et al. | 714/23 |
| 5,003,466 A | * | 3/1991 | Schan et al. | 714/41 |
| 6,546,483 B1 | * | 4/2003 | Lai | 713/1 |
| 6,678,804 B1 | * | 1/2004 | Funatogawa et al. | 711/154 |
| 2002/0133651 A1 | | 9/2002 | Wang et al. | |

OTHER PUBLICATIONS

"Based digital signal processor to develop the M3S novel kernel system" by Chen et al. (abstract only) Publication Date: Sep. 17-21, 2003.*

* cited by examiner

*Primary Examiner*—Gopal C. Ray
(74) *Attorney, Agent, or Firm*—Winston Hsu

(57) ABSTRACT

A PCI interface card coupled to a PCI bus includes a first controller and a second controller. When a processor coupled to the PCI bus initializes the PCI interface card, the first controller is enabled to respond with a message to the processor to indicate that the PCI interface card is a single-function device and the second controller is disabled. When the processor disables the first controller, the second controller is allowed to connect the processor through the first controller. A computer system includes the processor, the PCI bus, and the PCI interface card.

20 Claims, 3 Drawing Sheets

INTERFACE APPARATUS USING SINGLE DRIVER, COMPUTER SYSTEM INCLUDING INTERFACE APPARATUS USING SINGLE DRIVER, AND RELATED METHOD

BACKGROUND OF INVENTION

1. Field of the Invention

The present invention relates to interface control, and more particularly, to a apparatus using a single driver, a computer system including an apparatus using a single driver, and a related method.

2. Description of the Prior Art

Within computer systems nowadays, buses are essential, for example: ISA, PCI, PCI EXPRESS. Peripheral devices complying with the bus specification have become very popular. In order to save the number of interface slots occupied within a computer system, products such as interface cards are often implemented having multiple interface devices to meet end-user requirements.

Each interface device on the interface card requires a driver, which is a control program adaptive to the computer system where the interface card is installed. If one of the interface devices of the interface card needs the cooperation of another of the interface card, the two drivers for both interface devices involved and an additional driver for controlling the two drivers are required. Furthermore, if parameters related to calculations of both interface devices need to be transferred between the two interface devices, programmers will be required to add this functionality to the drivers and to debug these drivers while programming. As a result, programming the drivers of the multiple interface devices of the interface card is more complicated than programming a driver of a single interface device.

SUMMARY OF INVENTION

It is therefore an objective of the present invention to provide an interface apparatus using a single driver, a computer system including an interface apparatus using a single driver, and a related method to solve the above-mentioned problem.

The present invention provides an interface apparatus coupled to a bus, the interface apparatus including: a first controller for performing a logic operation, wherein when a processor coupled to the bus initializes the interface apparatus, the first controller is enabled to respond a message to the processor for indicating that the interface apparatus is a single-function device; and a second controller coupled to the first controller for performing a logic operation, wherein when the processor initializes the interface apparatus, the second controller is disabled; wherein when the processor disables the first controller, the second controller is allowed to communication with the processor through the first controller.

The present invention correspondingly provides a computer system comprising: a processor for controlling operations of the computer system; a bus coupled to the processor for transmitting data; and an interface apparatus coupled to the bus including: a first controller for performing a logic operation, wherein when the processor initializes the interface apparatus, the first controller is enabled to respond a message to the processor for indicating that the interface apparatus is a single-function device; and a second controller coupled to the first controller for performing a logic operation, wherein when the processor initializes the interface apparatus, the second controller is disabled; wherein when the processor disables the first controller, the second controller is allowed to communication with the processor through the first controller.

The present invention correspondingly provides a method for using a bus in the computer system which comprises a processor and an interface device, the interface device comprising a first controller and a second controller, the method comprising: generating a first message to indicate that the interface device is a single-function device when the interface device is initialized; generating a second message to request a total memory volume including a first portion that will be utilized by the first controller and a second portion that will be utilized by the second controller; and determining which one of the first controller and the second controller responds to the processor according to a command from the processor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
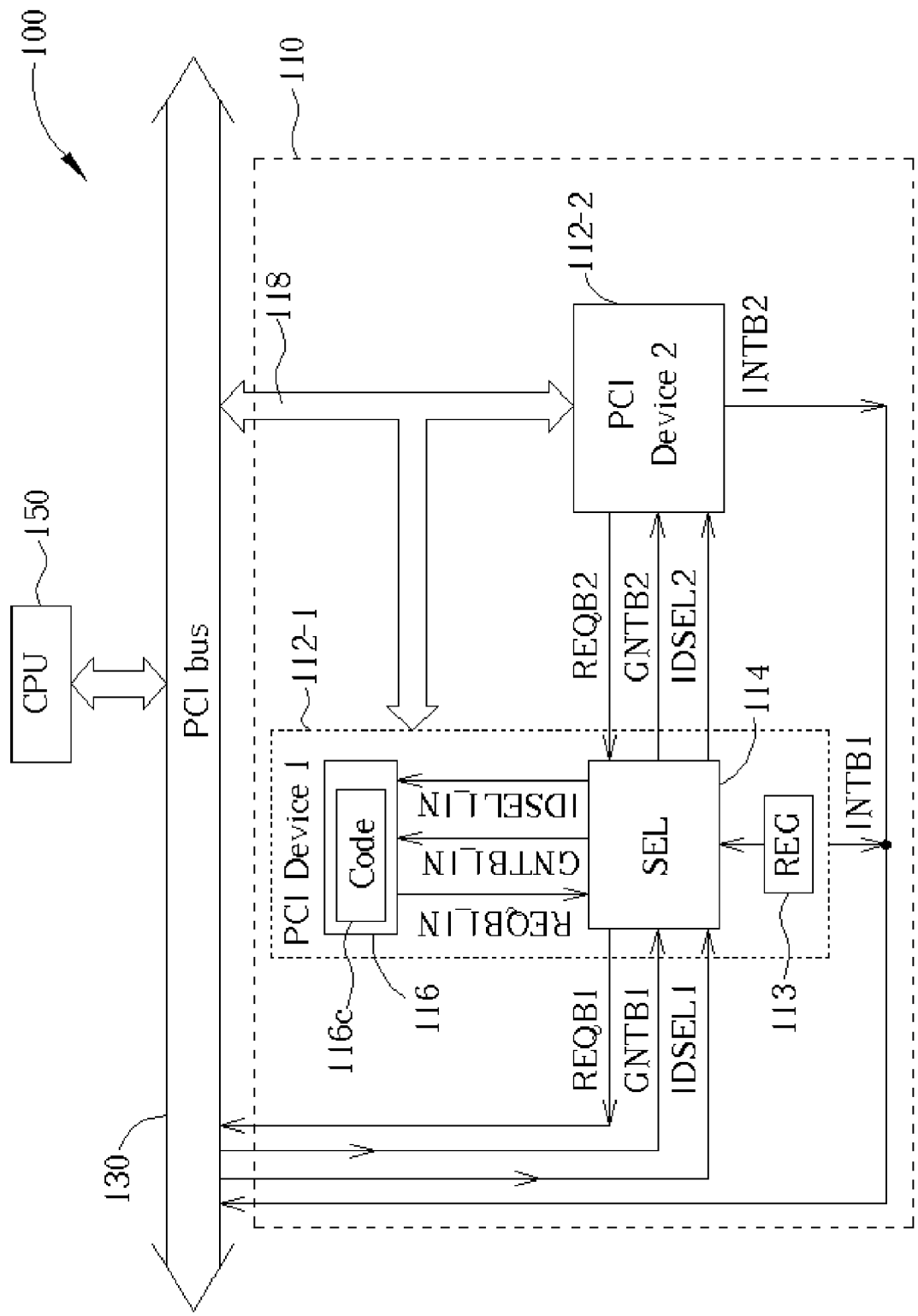
FIG. 1 is a block diagram of a computer system according to one embodiment of the present invention.

Please refer to FIG. 1 illustrating a block diagram of a computer system 100 according to a first embodiment of the present invention. In this embodiment, the computer system 100 includes a PCI interface card 110, a PCI bus 130 coupled to the PCI interface card 110 for transmitting data, and a processor 150 coupled to the PCI bus for controlling operations of the computer system 100. The PCI interface card 110 includes a first controller 112-1 labeled as PCI Device 1 in FIG. 1 for performing a logic operation and a second controller 112-2 labeled as PCI Device 2 in FIG. 1 for performing a logic operation.

In this embodiment, the first controller 112-1 includes a core circuit 116 for performing the logic operation of the first controller 112-1. The code 116c within the core circuit 116 is the program code for performing the logic operation of the first controller 112-1. The first controller 112-1 further includes a register 113 for storing a flag used to control whether the first controller 112-1 or the second controller 112-2 is enabled. The first controller 112-1 further includes a selecting module 114 coupled to the register 113. In the embodiment, the selecting module 114 couples to the core circuit 116 via REQB1_IN, GNTB1_IN, and IDSEL1_IN. Please note, the REQB1_IN, GNTB1_IN, and IDSEL1_IN are in accordance with the PCI specification.

As shown in FIG. 1, the selecting module 114 further includes a REQB pin REQB1, a GNTB pin GNTB1, and an IDSEL pin IDSEL1. Please note, the pins REQB1, GNTB1, and IDSEL1 are in accordance with the PCI specification and are well known in the art. The second controller 112-2 further includes a REQB pin REQB2, a GNTB pin GNTB2, and an IDSEL pin IDSEL2, all coupled to the selecting module 114. Please note, the pins REQB2, GNTB2, and IDSEL2 are in accordance with the PCI specification and are well known in the art. When the first controller 112-1 is enabled, the selecting module 114 connects the pins REQB1, GNTB1, and IDSEL1 to the REQB1_IN, GNTB1_IN, SEL1_IN, respectively. When the second controller 112-2 is enabled, the selecting module 114 connects the pins REQB1, GNTB1, and IDSEL1 to the pins REQB2, GNTB2, and IDSEL2, respectively.

As shown in FIG. 1, the first controller 112-1 further includes an INTB pin INTB1. In addition, the second controller 112-2 further includes an INTB pin INTB2 coupled to the pin INTB1 of the first controller 112-1. Furthermore, each of the controllers further includes a set of pins 118 coupled to the PCI bus 130. In the embodiment, the pins 118 includes: a plurality of address pins AD[31:0], a Frameb pin, an Irdyb pin, and a Trdyb pin, . . . , etc., all in accordance with the PCI specification and being well known in the art.

As a result of the connection illustrated in FIG. 1, only a single driver adaptive to the computer system 100 is required for controlling all the PCI devices, specifically the controllers 112-1 and 112-2, within the PCI interface card 110. According to an initial value of the flag stored in the register 113, when the processor 150 initializes the PCI interface card 110, the first controller 112-1 is enabled and responds with a message to the processor 150 to indicate that the PCI interface card 110 is a single-function device. At this time, the second controller 112-2 is disabled. In addition, when the processor 150 initializes the PCI interface card 110, the first controller 112-1 responds with a message to the processor 150 for requesting a total memory volume (A+B) including a first portion A that will be utilized by the first controller 112-1 and a second portion B that will be utilized by the second controller 112-2. That is, the memory-based address of the first controller 112-1 is set for accessing the total memory volume (A+B) but the first controller 112-1 only utilizes the first portion A.

According to the first embodiment shown in FIG. 1, when a PCI scan is performed, there is a message sent to the first controller 112-1 through the pin IDSEL1, but there is no message sent from the first controller 112-1 to the second controller 112-2 through the pin IDSEL1. Therefore, only the first controller 112-1 is responsible for PCI configurations when the PCI interface card is initialized. After the driver is started, the processor 150 executing the driver is capable of replacing the initial value of the flag stored in the register 113 with another value to enable the second controller 112-2 and disable the first controller 112-1. When the the second controller 112-2 is enabled, the second controller 112-2 is allowed to communicate with the processor 150 through the first controller 112-1. In this situation, the pins REQB2, GNTB2, and IDSEL2 of the enabled controller 112-2 are coupled to the pins REQB1, GNTB1, IDSEL1, respectively, while the core circuit 116 within the first controller 112-1 is isolated. Then, during a PCI configuration of the second controller 112-2, the memory-based address of the second controller 112-2 is set for accessing the second portion B.

After this, the driver may send commands to the first controller 112-1 or the second controller 112-2 as needed. The first controller 112-1 identifies any DMA access of the second controller 112-2 as required and sends a corresponding message to the second controller 112-2 for controlling the DMA access. If there are any interrupts generated by the first controller 112-1 or the second controller 112-2, the driver will be notified since the pins INT1 and INT2 are coupled.

The present invention correspondingly provides a method for using the PCI bus. The method is already disclosed above and is summarized as follows.

Step 10: Provide the PCI interface card 110 coupled to the PCI bus 130, wherein the PCI interface card 110 includes the first controller 112-1 and the second controller 112-2.

Step 20: When the PCI interface card 110 is initialized, enable the first controller 112-1 to respond with a message to the processor 150 coupled to the PCI bus 130 to indicate that the PCI interface card 110 is a single-function device.

Step 30: When the PCI interface card 110 is initialized, disable the second controller 112-2.

Step 40: When the second controller 112-2 is enabled, allow the second controller 112-2 to communicate with the processor 150 through the first controller 112-1 and the PCI bus 130.

Figure 2:
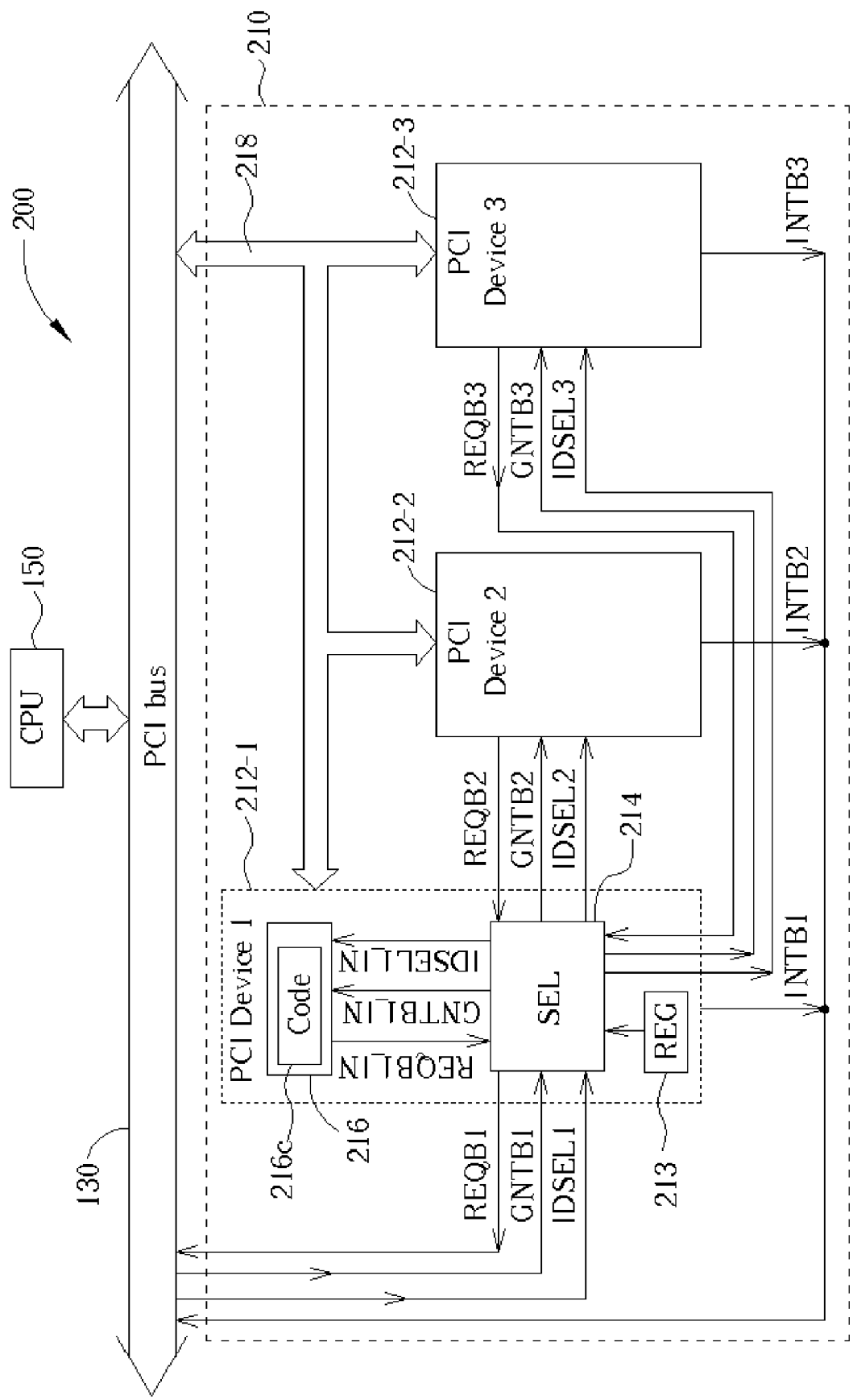
FIG. 2 is a block diagram of a computer system according to another embodiment of the present invention.

FIG. 2 illustrates a block diagram of a computer system 200 according to a second embodiment of the present invention. As shown in FIG. 2, a PCI interface card 210 of the computer system 200 includes components 212-1, 212-2, 213, 214, 216, and 218, which are similar to the components 112-1, 112-2, 113, 114, 116, and 118 of the computer system 100, respectively. The PCI interface card 210 further includes a third controller 212-3. In the second embodiment, when the first controller 212-1 is enabled, the selecting module 214 connects the pins REQB1, GNTB1, and IDSEL1 to the REQB1_IN, GNTB1_IN, and IDSEL1_IN, respectively. In addition, when the second controller 212-2 is enabled, the selecting module 214 connects the pins REQB1, GNTB1, and IDSEL1 to the pins REQB2, GNTB2, and IDSEL2, respectively. Furthermore, when the third controller 212-3 is enabled, the selecting module 214 connects the pins REQB1, GNTB1, and IDSEL1 to the pins REQB3, GNTB3, and IDSEL3, respectively. As connections of the third controller 212-3 within the PCI interface card 210 are similar to that of the second controller 212-2, and as the register 213 is for storing a flag to ensure that one of the controllers 212-1, 212-2, and 212-3 is enabled at a time, the operations of the second embodiment will not be repeated.

Figure 3:
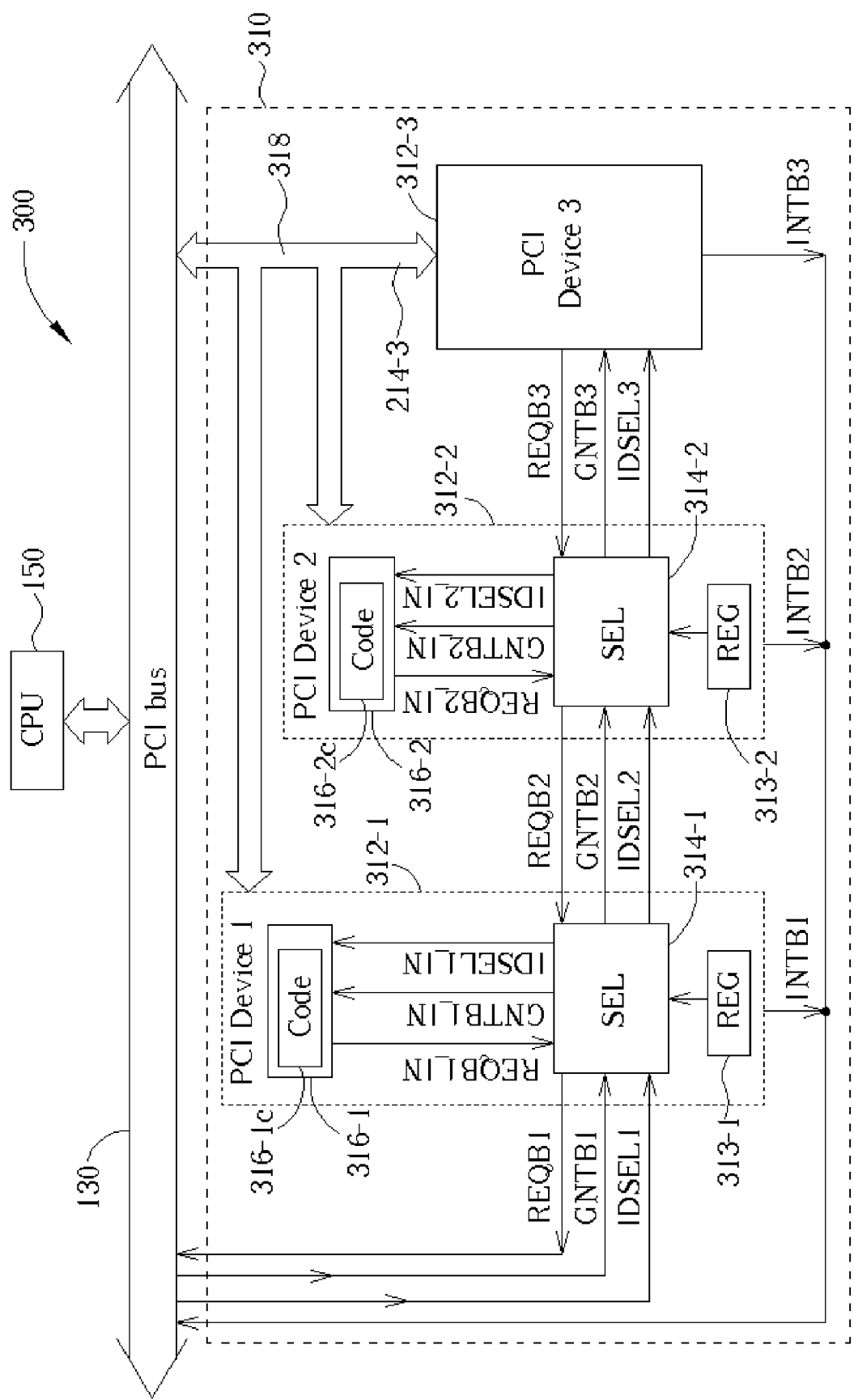
FIG. 3 is a block diagram of a computer system according to another embodiment of the present invention.

FIG. 3 illustrates a block diagram of a computer system 300 according to a third embodiment of the present invention. As shown in FIG. 3, a PCI interface card 310 of the computer system 300 includes components 312-1, 312-3, 313-1, 314-1, 316-1, and 318, which are similar to the components 112-1, 112-2, 113, 114, 116, and 118 of the computer system 100, respectively. The PCI interface card 310 of the computer system 300 further includes components 312-2, 313-2, 314-2, and 316-2, which are similar to the components 312-1, 313-1, 314-1, and 316-1, respectively, with the exceptions described as follows. As shown in FIG. 3, the pins REQB2, GNTB2, and IDSEL2 of the selecting module 314-2 are coupled to the selecting module 314-1, and the pins REQB3, GNTB3, and IDSEL3 of the third controller 312-3 are coupled to the selecting module 314-2. A flag stored in the register 313-2 is used to control whether either the second controller 312-2 or the third controller 312-3 is enabled if the first controller 312-1 is disabled. When the second controller 312-2 is enabled, the selecting module 314-2 connects the pins REQB2, GNTB2, and IDSEL2 to the pins REQB2_IN, GNTB2_IN, and IDSEL2_IN of the core circuit 316-2, respectively. In addition, when the third controller 312-3 is enabled, the selecting module 314-2 connects the pins REQB2, GNTB2, and IDSEL2 to pins REQB3, GNTB3, and IDSEL3, respectively. Furthermore, when either the second controller 312-2 or the third controller 312-3 is enabled, the selecting module 314-1 connects the pins REQB1, GNTB1, and IDSEL1 to the pins REQB2, GNTB2, and IDSEL2, respectively.

It is an advantage of the present invention method and device that when the PCI interface card is initialized, the first controller is enabled to respond with a message to the processor to indicate that the PCI interface card is a single-function device and the other controller(s) is disabled. As a result, only a single driver is needed for controlling the PCI interface card.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:
    a processor for controlling operations of the computer system;
    a bus coupled to the processor; and
    an interface device, coupled to the processor through the bus, comprising:
        a first controller for performing a first logic operation; and
        a second controller coupled to the first controller for performing a second logic operation;
        wherein when the processor initializes the interface device, the first controller responds with a message to the processor to indicate that the interface device is a single-function device and the second controller is disabled,
        wherein the first controller determines which one of the first controller and the second controller responds to the processor according to a command from the processor.

2. The computer system of claim 1, wherein the interface device comprises:
    a selecting module coupled to the second controllers for allowing either the first controller or the second controller to utilize the bus.

3. The computer system of claim 1, wherein the first controller comprises:
    a register for storing a flag used to control whether either the first controller or the second controller is enabled.

4. The computer system of claim 1, wherein the interface device is a PCI interface device and the bus is a PCI bus.

5. The computer system of claim 1, wherein when the processor initializes the interface device, the first controller responds with a message to the processor to request a total memory volume including a first portion that will be utilized by the first controller and a second portion that will be utilized by the second controller.

6. The computer system of claim 1, wherein the interface device further comprises:
    a third controller coupled to the first controller for performing a third logic operation.

7. The computer system of claim 1, wherein the interface device further comprises:
    a third controller coupled to the second controller for performing a third logic operation.

8. An apparatus coupled to a processor through a bus, the apparatus comprising:
    a first controller for performing a first logic operation, wherein when the processor initializes the apparatus, the first controller responds with a message to the processor to indicate that the apparatus is a single-function device; and
    a second controller coupled to the first controller for performing a second logic operation, wherein when the processor initializes the apparatus, the second controller is disabled;
    wherein the first controller determines which one of the first controller and the second controller responds to the processor according to a command from the processor.

9. The apparatus of claim 8, further comprises:
    a selecting module coupled to the first and second controllers for allowing either the first controller or the second controller to utilize the bus.

10. The apparatus of claim 9, wherein the selecting module is within the first controller.

11. The apparatus of claim 9, wherein the first controller comprises:
    a register for storing a flag used to control the operation of the selecting module.

12. The apparatus of claim 9, wherein the bus is a PCI bus and the first controller further comprises:
    a first INTB pin, a first REQB pin, a first GNTB pin, and a first IDSEL pin, all coupled to the PCI bus.

13. The apparatus of claim 12, wherein each of the controllers further comprises:
    at least a plurality of address pins, a Frameb pin, an Irdyb pin, and a Trdyb pin, all coupled to the selecting module, wherein the address pins, the Frameb pin, the Irdyb pin, and the Trdyb pin are in accordance with the PCI specification.

14. The apparatus of claim 8, wherein the first controller comprises:
    a register for storing a flag used to control whether either the first controller or the second controller responds to the processor.

15. The apparatus of claim 14, wherein the flag is changed by the processor.

16. The apparatus of claim 8 wherein when the processor initializes the apparatus, the first controller responds with a message to the processor to request a total memory volume including a first portion that will be utilized by the first controller and a second portion that will be utilized by the second controller.

17. A method for using a bus in the computer system which comprises a processor and an interface device, the interface device comprising a first controller and a second controller, and being coupled to the processor through the bus, the method comprising:
    generating a first message to indicate that the interface device is a single-function device when the interface device is initialized;
    generating a second message to request a total memory volume including a first portion that will be utilized by the first controller and a second portion that will be utilized by the second controller; and
    determining which one of the first controller and the second controller responds to the processor according to a command from the processor.

18. The method of claim 17 further comprising:
    using a flag stored in a register of the first controller to control whether either the first controller or the second controller responds to the command.

19. The method of claim 18 wherein the flag is changed by the processor.

20. The method of claim 18 wherein further comprising:
    disabling the second controller when the interface device is initialized.

* * * * *